United States Patent [19]

Occhiello et al.

[11] Patent Number: 5,380,583
[45] Date of Patent: Jan. 10, 1995

[54] MIXED-MATRIX COMPOSITE THERMOPLASTIC AND THERMOSETTING MATERIAL REINFORCED WITH CONTINUOUS FIBRES

[75] Inventors: Ernesto Occhiello; Adriano Ferrari; Fabio Garbassi, all of Novara; Domingo Cutolo, Gessate, all of Italy

[73] Assignees: Eniricerche, S.p.A.; Enichem, S.p.A., Milan, Italy

[21] Appl. No.: 99,702

[22] Filed: Jul. 30, 1993

[30] Foreign Application Priority Data

Jul. 31, 1992 [IT] Italy .............. MI.92-A/001891

[51] Int. Cl.⁶ ............................................. B32B 5/16
[52] U.S. Cl. .................... 428/283; 156/244.12; 264/136; 264/174; 428/288; 428/292; 428/294; 428/327; 428/373; 428/392; 428/394; 428/402; 428/902
[58] Field of Search ............... 428/283, 288, 292, 294, 428/327, 373, 392, 394, 402, 902; 264/136, 174; 156/244.12

[56] References Cited

U.S. PATENT DOCUMENTS

| 3,742,106 | 6/1993 | Price | 264/131 |
| 3,947,426 | 3/1976 | Lander | 260/77.5 TB |
| 4,614,678 | 9/1986 | Ganga | 428/74 |
| 4,699,579 | 10/1987 | Bourdon et al. | 425/113 |
| 5,047,453 | 9/1991 | Vost et al. | 264/122 |

FOREIGN PATENT DOCUMENTS

| 8600323 | 6/1985 | European Pat. Off. |
| 0188939 | 7/1986 | European Pat. Off. |
| 0391581 | 10/1990 | European Pat. Off. |

OTHER PUBLICATIONS

Ko, Chu, and Hua, "Damage Tolerance of Composites: 3-D Braided Commingled PEEK/Carbon", Journal of Applied Polymer Science: Applied Polymer Symposium 47, 501–519 (1991).

Encyclopedia of Composites, edited by S. M. Lee, published by VCH Publishers, New York (1991).

Primary Examiner—James J. Bell
Attorney, Agent, or Firm—Rogers & Wells

[57] ABSTRACT

A mixed-matrix composite material reinforced with continuous fibre comprising a flexible sheath of thermoplastic polymer covering a multifibre filament impregnated with a powder consisting of:

1–99% by weight, and preferably 50–95%, of a thermoplastic polymer;

99–1% by weight, and preferably 50–5%, of a reactive monomer and/or prepolymer which on thermal stressing is able to undergo crosslinking and/or molecular weight increase.

9 Claims, 2 Drawing Sheets

MIXED-MATRIX COMPOSITE THERMOPLASTIC AND THERMOSETTING MATERIAL REINFORCED WITH CONTINUOUS FIBRES

FIELD OF THE INVENTION

This invention relates to a mixed-matrix composite material reinforced with continuous fibres.

More specifically, the invention relates to a continuous fibre-reinforced mixed-matrix composite material comprising a thermoplastic component and a thermosetting component, and the method for its preparation.

Still more specifically, the invention relates to an essentially thermoplastic composite material consisting of rovings of continuous fibres of any type, whether mineral, organic or metal, impregnated with a powder comprising a thermoplastic component and a thermosetting component and covered with a thermoplastic outer sheath of the same type as or different type from the thermoplastic component of the powder.

BACKGROUND OF THE INVENTION

For many applications, initially dominated by the use of metals, composite materials have been proposed consisting of a polymer matrix and an inorganic reinforcement, particularly glass or carbon fibres. For conditions in which their performance has necessarily to be high from the mechanical strength viewpoint, composites comprising long or in particular continuous fibre are proposed.

The first type of long or continuous fibre composite developed as an alternative to metals was characterised by a matrix consisting of thermosetting polymers, of which epoxy resins, unsaturated polyester resins and bismaleimides are characteristic examples. The methods for transforming this type of material were and still are preimpregnation and pultrusion.

With both these methods the fibres are passed through suitable solutions of the thermosetting material, leading to environmental problems and problems of process cost in view of the need to make provision for reusing and/or storing the solvents used. To obviate such drawbacks, composite materials have recently been introduced which use thermoplastic polymers as the matrix. In this case the relative transformation requires the formation of a preliminary product if the composite is of the long or continuous fibre type.

An example of the preparation of such a preliminary product is reported in U.S. Pat. No. 3,742,106, which describes the formation of a composite by impregnating a continuous reinforcement filament in a molten thermoplastic material, or in U.S. Pat. No. 4,614,678 which describes the formation of a composite by impregnating a fibre roving with thermoplastic powder and covering the roving with a thermoplastic sheath.

A further example of a preliminary product for composites of thermoplastic matrix type is reported in the Journal of Applied Polymer Science - Applied Polymer Symposium, vol. 47, page 501, 1991, which describes the preparation of a continuous filament by extruding a mix consisting of reinforcement and thermoplastic fibres.

After preparing the preliminary product, the final piece is prepared by consolidation methods which can comprise heating and applying pressure, as reported for example at various points in the Encyclopedia of Composites, edited by S. M. Lee, published by VCH Publishers, New York, 1991, or pultrusion of the preliminary product itself.

The use of thermoplastic composites has lead to undoubted improvements from the environmental viewpoint as solvents are not used in the production cycle. Certain thermal and mechanical problems are however observed, which are not present with thermosetting resins, in particular when thermoplastic polyester-based matrices are used. In the case for example of polyethyleneterephthalate or polybutyleneterephthalate, limited performance is observed under shear, which makes it difficult to design components from which a certain level of performance is required, or viscoplastic behaviour is observed, i.e. a considerable variation in mechanical properties with time. This effect is particularly evident at high temperature, in that the thermoplastic material tends to suffer increased creep in response to increased temperature.

Attempts to combine the characteristics of thermoplastic matrix composites with the characteristics of thermosetting matrix composites are illustrated in the literature. Published European patent application 391,581 describes composites obtained by laminating thermoplastic matrix layers with thermosetting matrix layers. However this method as a considerable point of weakness linked to the consolidation and interface of layers of different mechanical characteristics.

SUMMARY OF THE INVENTION

The present applicant has now discovered a new continuous-fibre composite material of mixed matrix which combines the advantages of thermoplastic and thermosetting polymers, without the aforesaid drawbacks.

In particular the typical advantages of thermoplastic composites are achieved, such as lesser environmental problems because of the absence of solvents, easy processability by compression moulding or filament winding methods, excellent strength of the resultant articles etc., as are the advantages of thermosetting composites such as considerable rigidity, better persistence of mechanical properties at high temperature, high creep resistance and fatigue strength.

DETAILED DESCRIPTION OF THE INVENTION

Figure 1:
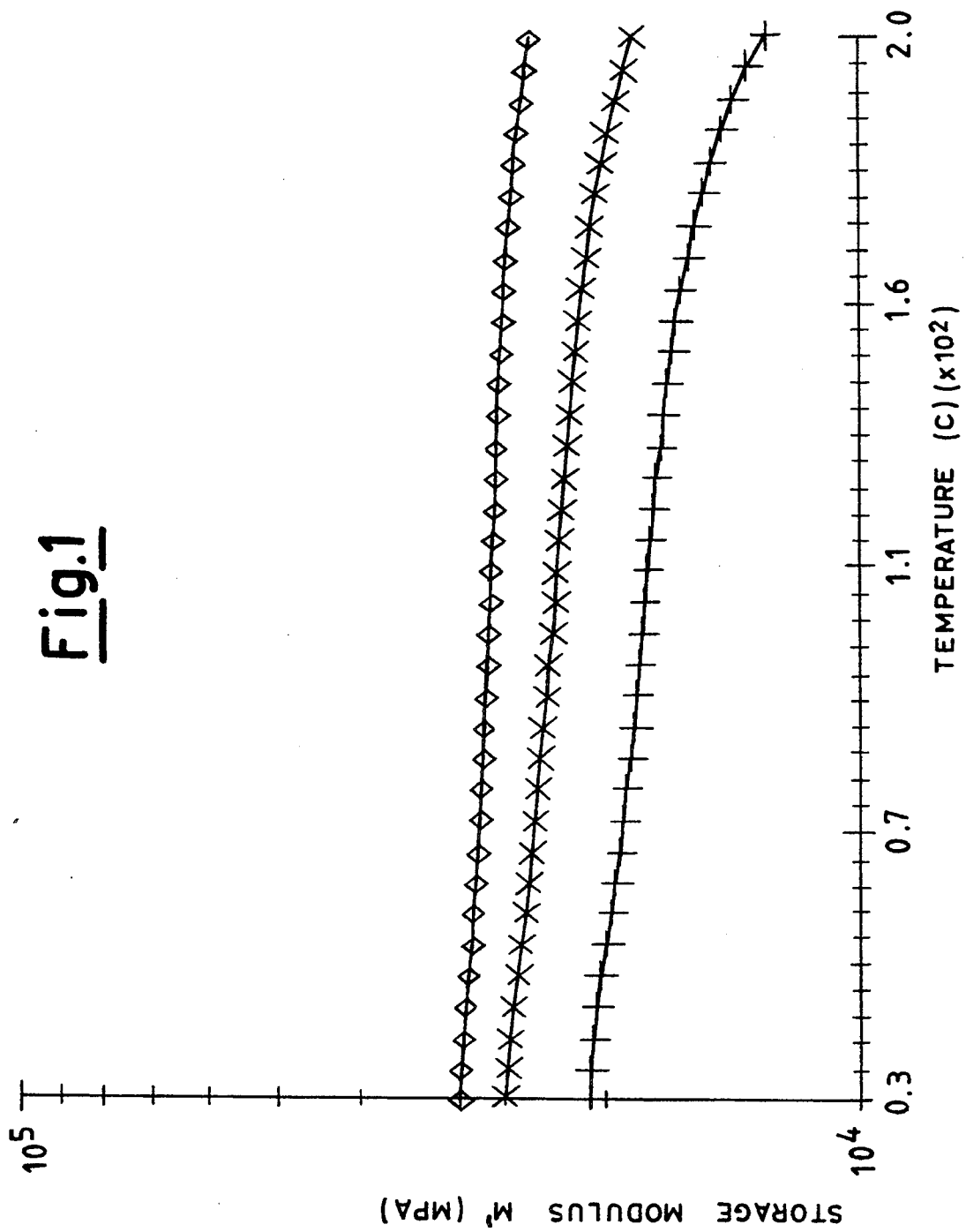
FIG. 1 shows the results of dynamic-mechanical characterization of the composite material prepared as described in Examples 1-3.

The present invention therefore provides a mixed-matrix composite material reinforced with continuous fibre comprising a flexible sheath of thermoplastic polymer covering a multifibre filament impregnated with a powder consisting of:

1-99% by weight, and preferably 50-95%, of a thermoplastic polymer;

99-1% by weight, and preferably 50-5%, of a reactive monomer and/or prepolymer which on thermal stressing is able to undergo crosslinking and/or molecular weight increase.

More specifically, the present invention provides a mixed-matrix composite material reinforced with continuous fibre and prepared by a method comprising:

a) unwinding a continuous filament in the form of a fibre roving from a bobbin;

b) opening the filament essentially into its individual fibres;

c) bringing the opened filament into contact with a powder consisting of a thermoplastic polymer and a reactive monomer and/or prepolymer which on thermal stressing is able to undergo crosslinking and/or molecular weight increase;

d) reassembling the filament and arranging about it a flexible protective sheath of thermoplastic polymer.

The composite material of the present invention has high flexibility, enabling it to be woven to form highly flexible matting or be used as such to form articles of any shape or size by the filament winding method. The composite obtained in this manner can have a fibre content of up to 90% by volume, and preferably between 40 and 60%.

Any type of filament can be used to prepare the composite of the present invention. Typical examples are glass fibres with a count of between 150 and 2500 tex, Kevlar aramide fibres with a count of between 1000 and 2000 decitex, and carbon fibres with a count of between $3 \times 10^3$ and $12 \times 10^3$ filaments.

The filament can be opened by a system comprising at least two rollers, one of which drives. Having opened the roving, the filament is brought into contact with the powder.

The powder particle size is not critical in forming the composite of the present invention. The only critical aspect can be the thickness or diameter of the individual constituent fibres of the filament.

In this respect, as the impregnation of the filament with the powder is achieved by the particles accumulating about each fibre, it is preferable for said particles to have an average size approximately equal to or less than the thickness of each individual fibre. Generally the average diameter of the individual particles is between 10 and 100 micrometres. The opened filament can be impregnated with the powder by dragging the opened filament through the powder, which is maintained in a fluidized state by inert gases as described in U.S. Pat. No. 4,614,678.

Any thermoplastic polymer can be used to prepare the composite of the present invention, examples being polyolefins such as low, medium or high density polyethylene, polypropylene, polystyrene, copolymers of ethylene with propylene and/or butenes, halogenated polyolefins such as polyvinylchloride, polyvinylidenechloride, polyvinylfluoride, polyvinylidenefluoride, styrene copolymers (ABS, SAN etc.), aliphatic (co)-polyesters such as polyethyleneterephthalate, polybutyleneterephthalate, polyethylenenaphthalenedicarboxylate and relative copolymers, aromatic polyesters, polyacrylates and/oe polymethacrylates and relative copolymers, thermotropic liquid crystal polymers, Pa-6, Pa-6,6, Pa-4,6, Pa-11 and Pa-12 polyamides, polycarbonates such as that of bisphenol-A, polyetherimides, polyketones, polysulphones etc., and their mixtures.

Reactive monomers and/or prepolymers which on thermal stressing are able to undergo crosslinking and/or molecular weight increase and can be used in the composite material of the present invention are those available in the form of powders and which comprise at least two reactive groups following temperature increase. Examples of materials with these properties are bismaleimides, nadiimides, epoxides, isocyanates etc. and/or prepolymers deriving from them.

Preferred products are bismaleimides of general formula:

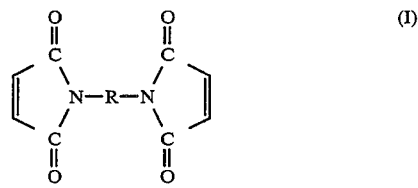

or epoxides of general formula:

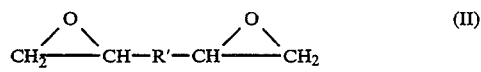

where R and R' represent $C_1$-$C_{30}$ aliphatic aliphatic radicals or $C_6$-$C_{30}$ aromatic radicals, possibly containing heteroatoms such as oxygen. Further preferred products are prepolymers obtainable from the monomers of general formulas (I) and (II). Examples of such prepolymers are those obtainable commercially under the commercial names NOLIMID of Rhone Poulenc and EPIKOTE of Shell.

When the opened filament has been impregnated it is reassembled and covered with a thermoplastic sheath such that the weight ratio of impregnating powder to sheath is between 1:2 and 2:1. The constituent material of the sheath is chosen from the previously listed thermoplastic polymers and can be of the same type as or different type from that of the component thermoplastic polymer of the powder. Sheaths of polymers which are not only different from but have higher or lower melting points than the constituent polymers of the thermoplastic component of the powder can also be used.

The sheath is arranged about the continuous filament by known methods, for example by extrusion, as described in published European patent applications Nos. 188,939 and 190,522.

The composite material of the present invention has high flexibility, enabling it to be woven to form highly flexible matting or be used as such to form articles of any shape or size by the filament winding method.

More particularly, the composite material of the present invention is suitable for use as an alternative to metals and metal alloys in the building, transport, aerospace and other industries. The following examples are provided by way of non-limiting illustration to enable the present invention to be better understood and implemented.

EXAMPLES 1-3

A 320 tex glass filament type OCF R28 of Owens Corning Fiberglass is impregnated with a powder formed from polybutyleneterephthalate (PBT) type PIBITER N100 of ECP Enichem Polimeri, Milan, and a thermosetting polyimide reactive prepolymer (PI) type NOLIMID 1 of Rhone Poulenc.

The PTB was ground to a powder of particle size about 60 micrometres. The polyimide was ground to a powder of particle size about 20 micrometres.

The filament is impregnated with the powder maintained in a fluidized bed state by the method described in U.S. Pat. No. 4,614,678.

After impregnation, a sheath formed from the same polymer as the thermoplastic component of the powder is applied to the filament. The matrix: sheath weight ratio is 1:1.

The sheath is applied to the filament by a Maillefer 30 extruder fitted with a die of the type used for sleeving. The die diameter is 3.5 mm; the mandrel diameter is 2.9 mm; the filament guide diameter is 1.5 mm; the die inlet diameter is 2.4 mm.

The die temperature is maintained at 250° C. with a filament feed rate of 40 m/min.

Further characteristics of the composite material are given in Table 1.

Test pieces for mechanical and dynamic-mechanical characterisation were prepared from the composite filament prepared in this manner.

The filament was wound manually about a rectangular plate, taking care to fill the space as regularly as possible.

The plate was then partially welded to facilitate its handling, after which it was cut in a direction perpendicular to the filament to obtain samples of dimensions 20×20 cm. Ten samples were then stacked on each other unidirectionally and compression moulded under the following conditions:

T 250° C.; P 16 bar; Time 20 minutes.

The final plate was cut by the water jet method to obtain the test pieces for the mechanical and dynamic-mechanical tests.

The dynamic-mechanical experiments were carried out using a Dynastat instrument operating at a frequency of 1 Hz. Test pieces of dimensions 60×12×3 mm were used with a three-point flexural geometry (41 mm span between supports). The temperature gradient is 1° C./min.

FIG. 1 shows the final results. For the samples obtained from mixed-matrix composites, Examples 1 (◊) and 2 (X), a greater rigidity is apparent throughout the entire temperature range investigated compared with the sample obtained from a composite with only a thermoplastic matrix, Example 3 (+).

Mechanical bending tests were carried out using a model 312.31 MTS frame, with a span/thickness ratio of 40, in accordance with ASTM D790M. The breaking load is defined as that load at which initial damage to the test piece occurs, as determined by the appearance of a discontinuity in the load-deformation curve.

The tests were conducted at ambient temperature (23° C.) and at a temperature intermediate between the glass transition temperature and the melting point of the PBT.

Table 2 shows the relationship between the moduli and loads at different temperatures.

Both for the moduli and for the breakage loads a ratio reduction is observed with the introduction of thermosetting material. For the breaking load there is a clear reduction, showing greater temperature resistance of the mixed-matrix material.

EXAMPLES 4-5

The procedure of the previous examples was followed, except that carbon fibres type SOFICAR T300 6K of Soficar were used as the filament and a polyetherimide type ULTEM of General Electric was used as the thermoplastic material. The die temperature was 350° C. Table 1 shows further characteristics of the material.

The samples prepared from the composite were compression moulded under the following conditions:

T 350° C.; P 16 bar; Time 20 minutes.

Figure 2:
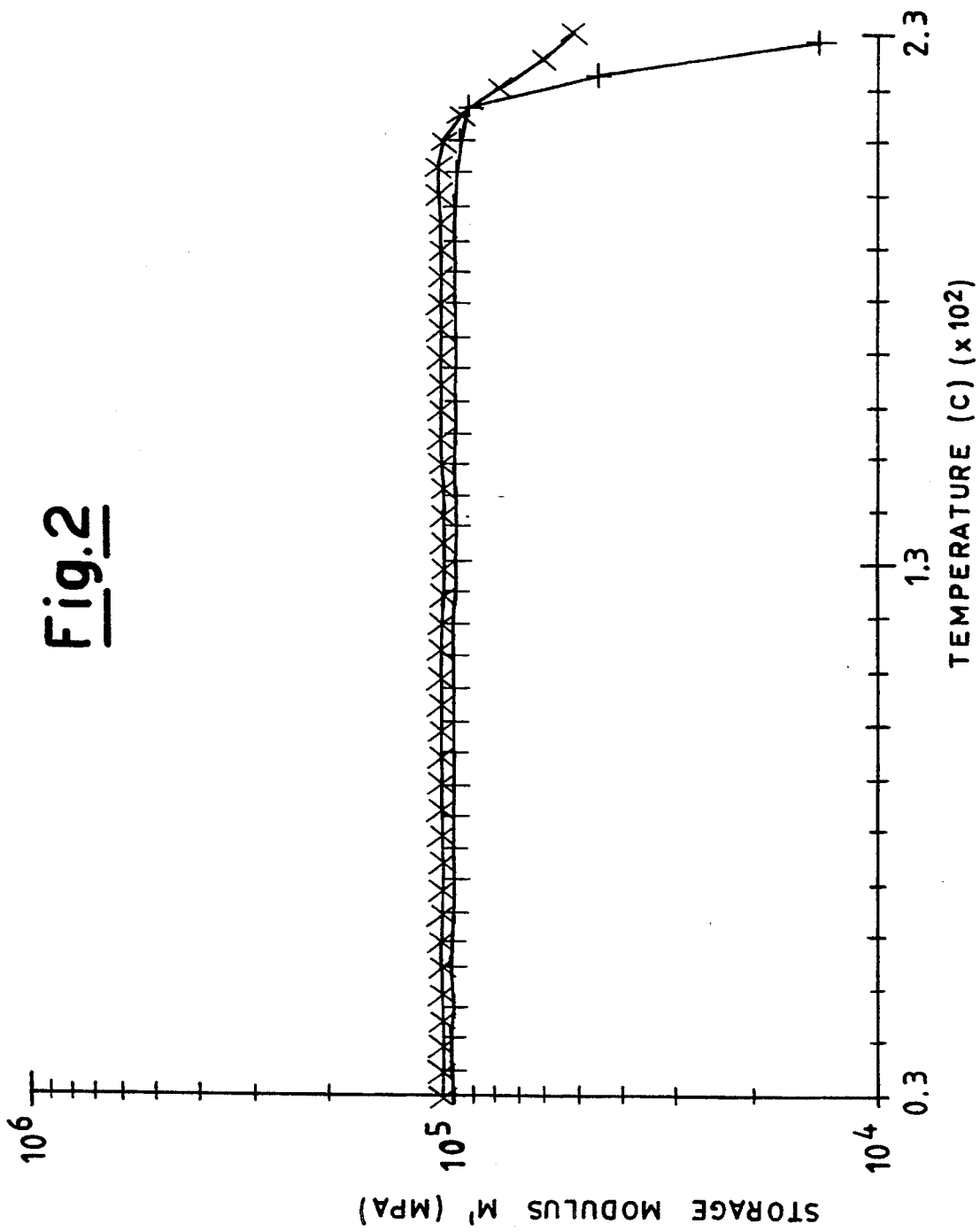
FIG. 2 shows the results of dynamic-mechanical characterization of the composite material prepared as described in Examples 4-5.

The results of the dynamic-mechanical experiments, conducted as in the previous examples, are shown in FIG. 2. It will be seen that at temperatures close to the polyetherimide glass transition temperature there is a greater persistence of the modulus for the mixed-matrix product (X=Example 4, +=Example 5).

The mechanical bending tests were carried out both at ambient temperature and close to the polyetherimide glass transition temperature (190° C.). Table 2 shows the modulus and breaking load ratios at various temperatures. The modulus ratio does not vary with the introduction of the thermosetting material, whereas there is a clear reduction in the load ratio showing high temperature resistance of the mixed-matrix material.

TABLE 1

| Example | Fibre Type | Fibre vol % (1) | TP Resin Type | TS Resin Type | TS Resin wt % (2) |
|---|---|---|---|---|---|
| 1 | glass | 63 | PBT | PI | 30 |
| 2 | glass | 60 | PBT | PI | 10 |
| 3 (comparison) | glass | 38 | PBT | | |
| 4 | carbon | 81 | PEI | PI | 5 |
| 5 (comparison) | carbon | 73 | PEI | | |

(1) On the total composite - TP = thermoplastic
(2) On the powder alone - TS = thermosetting

TABLE 2

| Sample | $E_a/E_h$ | $C_a/C_h$ |
|---|---|---|
| Example 1 | 1.1 | 2.2 |
| Example 2 | 1.2 | 3.0 |
| Example 3 (comparison) | 1.4 | 3.2 |
| Example 4 | 1.1 | 2.0 |
| Example 5 (comparison) | 1.1 | 2.2 |

$E_a$ = flexural elastic modulus at ambient temperature
$E_h$ = flexural elastic modulus at high temperature
$C_a$ = breaking load at ambient temperature
$C_h$ = breaking load at high temperature

EXAMPLES 6-8

Using the same operating conditions as in the preceding examples, a composite was prepared from PBT, an epoxy resin reactive prepolymer type EPIKOTE 1004 of Shell, and a 1200 tex glass filament.

Table 3 shows the characteristics of the composite material.

TABLE 3

| Example | Fibre | TP Resin | wt % TS Resin |
|---|---|---|---|
| 6 | glass | PBT | 10 |
| 7 | glass | PBT | 30 |
| 8 (comparison) | glass | PBT | — |

Using the previously described method, test pieces were obtained from the filament prepared in this manner. The results in terms of modulus (E) and breaking load (C) at ambient temperature are given in Table 4.

TABLE 4

| Sample | E(GPa) | C(MPa) |
|---|---|---|
| Example 6 | 43.4 | 804 |
| Example 7 | 46.1 | 770 |
| Example 8 (comparison) | 39.7 | 938 |

We claim:

1. A mixed-matrix composite material reinforced with continuous fibre comprising a flexible sheath of thermoplastic polymer covering a multifibre filament impregnated with a powder consisting of:
   1-99% by weight of a thermoplastic polymer;
   99-1% by weight of a reactive monomer and/or prepolymer which on thermal stressing is able to undergo crosslinking and/or molecular weight increase.

2. A composite material as claimed in claim 1, prepared by a method comprising:
   a) unwinding a continuous filament in the form of a fibre roving from a bobbin;
   b) opening the filament essentially into its individual fibres;
   c) bringing the opened filament into contact with a powder consisting of a thermoplastic polymer and a reactive monomer and/or prepolymer which on thermal stressing is able to undergo crosslinking and/or molecular weight increase;
   d) reassembling the filament and arranging about it a flexible protective sheath of thermoplastic polymer.

3. A composite material as claimed in claim 1, wherein the fibre content is up to 90 vol %.

4. A composite material as claimed in claim 2, wherein the filament is opened by a system comprising at least two rollers, of which at least one drives.

5. A composite material as claimed in claim 1, wherein the average diameter of the individual constituent particles of the powder is between 10 and 100 micrometres.

6. A composite material as claimed in claim 2, wherein the opened filament is impregnated with the powder by dragging the opened filament through the powder, which is maintained in a fluidized state by inert gases.

7. A composite material as claimed in claim 1, wherein the reactive monomers and/or prepolymers able to undergo crosslinking and/or molecular weight increase are those available in the form of powders and which comprise at least two reactive groups following temperature increase.

8. A composite material as claimed in claim 1, wherein the thermoplastic sheath is such that the weight ratio of the impregnating powder to the sheath is between 1:2 and 2:1.

9. A method for preparing the composite material in accordance with claim 1, comprising:
   impregnating a multifibre filament with a powder consisting of a thermoplastic polymer and a reactive monomer and/or prepolymer which on thermal stressing is able to undergo crosslinking and/or molecular weight increase;
   applying to the filament treated in this manner a flexible sheath of thermoplastic polymer.

* * * * *